United States Patent [19]
Biermann

[11] 3,799,190
[45] Mar. 26, 1974

[54] OIL CONTROL
[75] Inventor: William A. Biermann, Brookfield, Wis.
[73] Assignee: Controls Company of America, Schiller Park, Ill.
[22] Filed: Nov. 21, 1972
[21] Appl. No.: 308,349

[52] U.S. Cl.................. 137/405, 251/206, 251/297
[51] Int. Cl............................................. F16k 11/02
[58] Field of Search ........... 137/386, 400, 405, 409; 251/206, 207, 229, 297

[56] References Cited
UNITED STATES PATENTS
3,625,244   12/1971   Giwosky ............................ 137/405
3,654,954   3/1972    Giwosky ............................ 137/400

*Primary Examiner*—Alan Cohan
*Assistant Examiner*—David R. Matthews
*Attorney, Agent, or Firm*—Michael, Best & Friedrick

[57] ABSTRACT

Oil flows into the control valve body past the float controlled inlet valve to maintain a constant level in the body. The thin metering disc is rotatable to multiple positions in which a metering orifice underlies the float chamber outlet to accurately meter the flow. The disc is biased against the outlet by a spring which gives a constant spring force on the disc. The disc is turned by means of the manual knob operating a shaft at the lower end of which is a detent star wheel keyed to the shaft and engaged by springs which engage the valleys in the wheel to properly position the metering disc with a selected orifice in registry with the outlet. The detent arrangement does not impose any vertical loading on the shaft and cannot affect the spring force acting on the disc. The opposed springs acting on the star wheel balance each other so far as any load on the shaft is concerned. When the knob is turned to "off," the spring arm acts on the link to lift the float and force the inlet valve closed. If the oil level rises too high (due to leakage at the inlet valve), the inverted L-shaped safety float flips clockwise to wedge in the valve closed position until manually reset.

2 Claims, 4 Drawing Figures

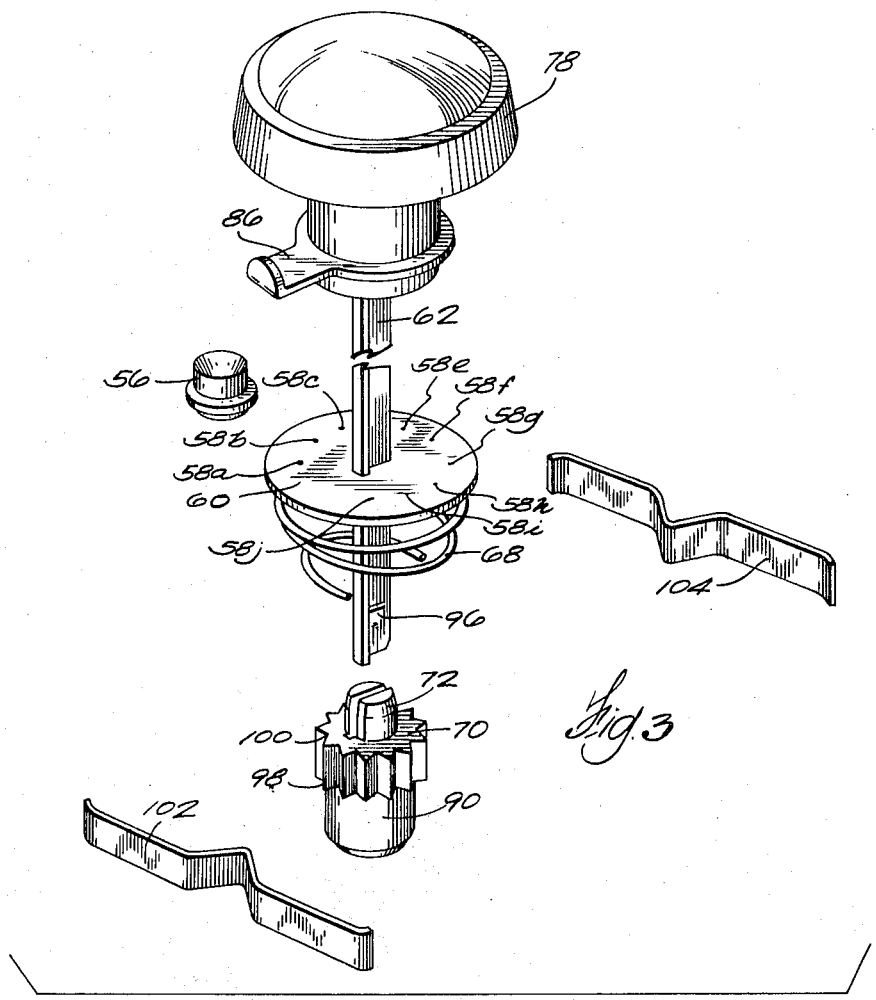
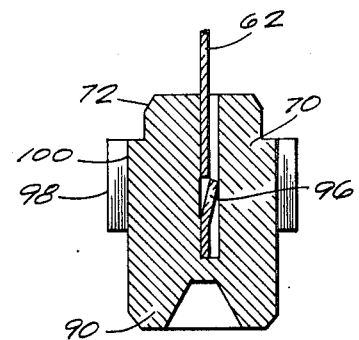

OIL CONTROL

BACKGROUND OF THE INVENTION

U.S. Pat. No. 3,625,244 shows an oil control valve provided with the thin metering disc utilized in this design. This use of a thin metering disc, whether horizontally or vertically disposed, has greatly improved the accuracy of metering in oil controls. In the patented design, however, the detent arrangement serving to register the metering orifices with the outlet resulted in imposition of a vertical force which would vary as the disc was turned from one position to another. This variation in the vertical force resulting from the detent had the effect of varying the spring load holding the thin disc against the outlet. As a consequence of this variation the desired wiping and cleaning action of the outlet against the disc was erratic.

SUMMARY OF THE INVENTION

The present design results in greatly improved wiping and cleaning action since the spring force on the thin metering disc is constant and there is no opportunity for variation of the force acting on the disc permitting grit to work under the outlet surface. The detent arrangement provides a balance loading on the actuating shaft and, hence, does not introduce any undue frictional forces, thus assuring the proper "feel" and actuating force for the knob. The spring loading mechanism incorporated in the detent is arranged to prevent positioning the disc on the crest or points of the detent star which would result in the disc being between metering positions.

DESCRIPTION OF THE DRAWINGS

FIG. 3 is an exploded perspective of the actuating member, metering disc, and detent mechanism.

FIG. 4 is an enlarged detail in cross section showing the manner in which the actuating shaft is connected to the detent.

DESCRIPTION OF THE PREFERRED EMBODIMENT

Figure 1:
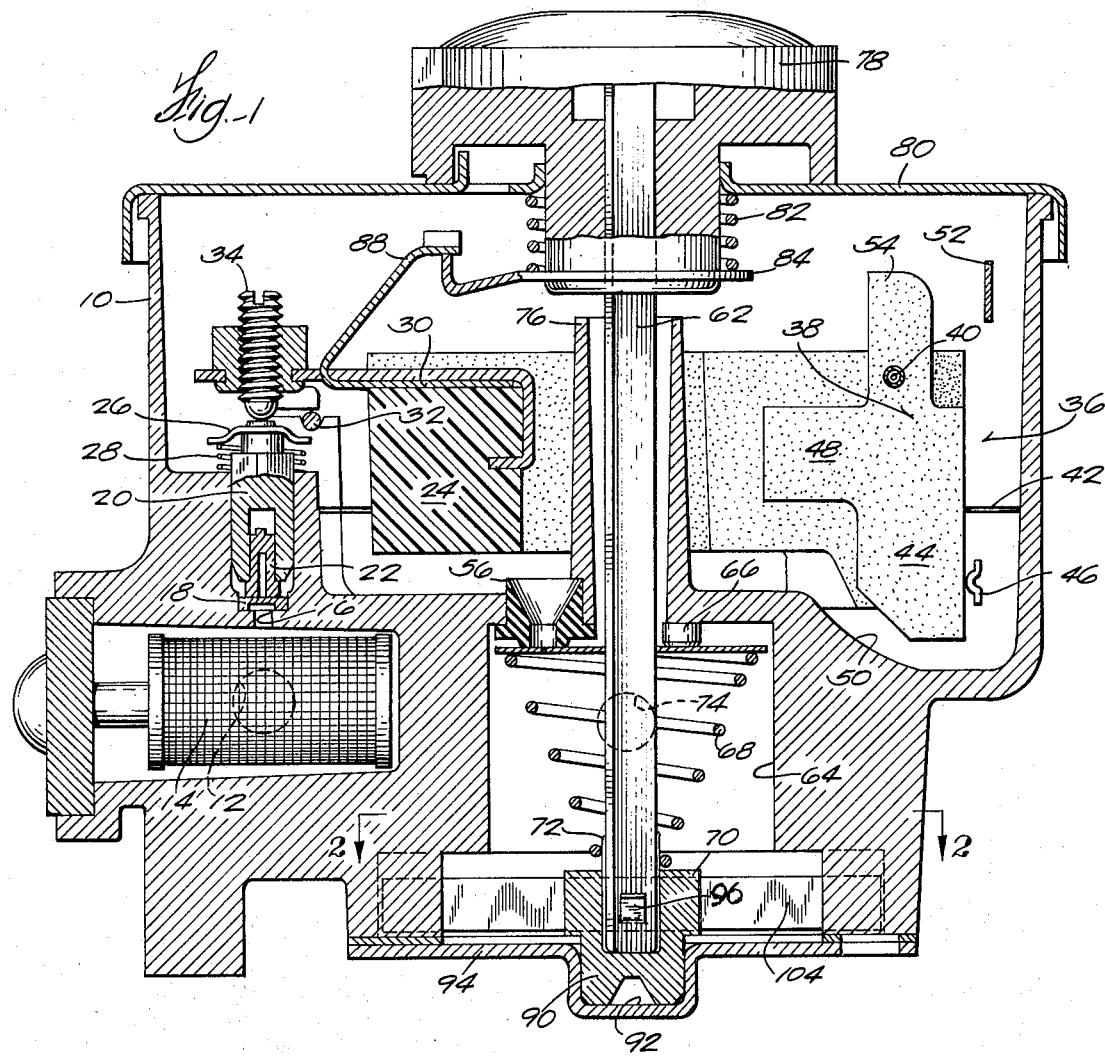
FIG. 1 is a vertical section through a control provided with this invention.

Oil enters the control valve body 10 through inlet 12 and passes through filter 14 to flow upwardly through bore 16 to the pressed-in valve seat 18. Valve 20 includes resilient tip 22 which is moved towards and from the seat 18 to meter flow in accordance with the motion imparted to the valve by float 24. Flow past the resilient valve face passes between the square valve stem and the circular bore in which the valve operates. The upper end of the valve is provided with a plate 26 and spring 28 is compressed between that plate and the body to urge the valve in the open direction. The foam float is mounted on the bracket 30 which is pivoted at 32 and is provided with an adjustable valve actuator 34. As the float rises due to an increasing level in the valve body, the actuator 34 will act on valve 20 to close the valve and shut off flow to the float chamber 36.

Safety float 38 is pivoted at 40 and under normal operating conditions the oil level (indicated by the dashed line 42) submerges only the lower or depending leg 44 of the safety float and its center of buoyancy is to the right of pivot 40 and moves the safety float against stop 46. This buoyancy is added to the buoyancy of the main float 24 in normal operation. If, however, the inlet valve leaks and the oil level starts to rise, the other leg 48 of the safety float becomes submerged and ultimately the center of buoyancy of the float moves to the left of the pivot 40 whereupon the float swings in a clockwise direction until the lower corner of the safety float wedges against body surface 50. Under this condition the control cannot be placed into operation until the level is restored to normal and the safety float is returned to the illustrated position by moving the reset 52 against the upwardly projecting arm 54 of the safety float.

A suitable plastic outlet 56 is pressed into the bottom of float chamber 36 and leads to one of the metering orifices 58a through 58j or a blank in the plate 60. The plate is connected to the angle section portion of shaft 62 by merely loosely fitting the shaft through a suitable cutout in the plate. The cavity 64 in which the plate is mounted is provided with two bosses 66 (only one of which is shown) equally spaced from the outlet 56 to give the plate a three-point support. The plate is loose on shaft 62 so that spring 68 can urge the plate upwardly into firm contact with the resilient outlet 56. The spring is compressed between the plate and the upper surface of the star or detent 70 around the hub portion 72. The star is connected to shaft 62. The oil flowing past the metering plate leaves chamber 64 through outlet 74. Any air entrained in the oil can escape through the central standpipe 76 which also serves as an overflow if leakage at the inlet continues after operation of the safety float. The upper end of shaft 62 is secured in knob 78 which is accessible from above the cover 80. The spring 82 compressed between the underside of cover 80 and plate 84 connected to the knob acts to hold the knob down. The laterally projecting finger 86 will, in the "off" position of the knob, move under link 88 to resiliently lift the float and exert the spring force through the float lever and actuator onto the inlet valve to force the inlet valve closed.

The star member has a lower projecting bearing portion 90 which is received in the well 92 in the cover plate 94 secured to the underside of the valve body. This journals the lower end of shaft 62. It will be noted the hub portion 72 and the star portion are provided with a cut-out designed to receive the lower end of the shaft 62 extending downwardly from the knob. The shaft has a lock tab 96 pierced from the flat of the shaft and adapted to engage the side wall of the slot in the plastic star wheel assembly. This locks the star wheel on the shaft. Since the cross-sectional shape of the shaft is L-shaped and since the slot in the metering disc and in the detent and in the underside of the knob are so arranged, proper correlation between the knob and the metering holes and the hills 98 and valleys 100 on the star must result in assembly.

Figure 2:
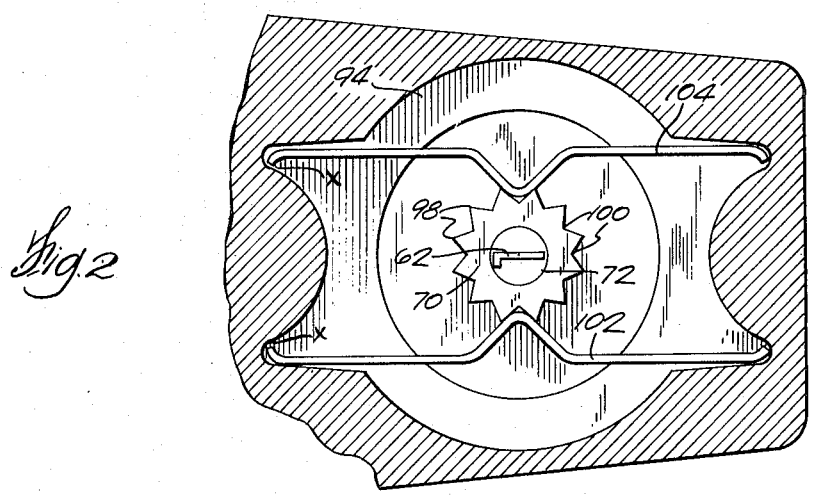
FIG. 2 is a cross section taken as indicated by line 2—2 on FIG. 1.

A pair of springs 102, 104 are mounted in the cavity 64 with the center of each spring bent to a generally V shape adapted to engage a valley 100 between adjacent teeth 98. The two springs engage opposite valleys so the force of the springs is cancelled insofar as the bearing portion 90 is concerned and, hence, no undue frictional loads are introduced into the actuating mechanism for the disc. It will be noted that the ends of the springs are received in cooperating cavities in the housing and that a slight clearance X (FIG. 2) is provided between the housing and the ends of the springs. This permits slight free play of each spring and, as the star wheel is turned, one spring will tend to move with the star while the other cannot since it abuts the cavity wall. This, then, means that when a hill 98 is positioned directly under the V of one spring, the other spring will not be quite on the hill. If the operator were to attempt to leave the mechanism in that position, the spring not quite on the hill would be effective to drive the star wheel to a position in which both the springs will be engaging a valley and, hence, a metering orifice will be in registry with the outlet 56.

It will be appreciated that the spring forces imposed by the detent mechanism cannot be translated into vertical forces in any way affecting the spring force acting on the metering plate or disc. Since the spring 68 urging the disc against outlet 56 bears against the star 70 and the integral bearing portion 90 which, in turn, seats on the bottom of well 92 in the bottom cover 94, there is a solid backup for the spring 68 and, hence, the force acting on the metering disc remains perfectly uniform. Therefore, the desired wiping action keeping the disc clean and the orifices open is bound to occur. This might be termed a squeegee action which serves to clean the plate and the orifice coming into registry and this insures the desired accuracy over a long service life.

It will be noted that the disc 60 is flat and is very thin and, hence, the metering flow path (determined by the thickness of the plate) is relatively unaffected by the viscosity of the oil. In practice, the thickness is 0.01 inches. The holes are illustrated as being quite small and progressing from the smallest, 58a, to the largest, 58j, range from 0.016 inches to 0.047 inches in one version of the control. All of these are substantially smaller than the orifice provided by fitting 56 leading from the flow chamber and, therefore, the flow characteristic through the outlet fitting has little bearing on the metering characteristic of the orifices. These orifices can be punched with extreme accuracy and, therefore, the flow rate can be readily predetermined. The accuracy is such that there is no need to calibrate each control with oil prior to shipment, as has been the past practice. The flow characteristics are so predictable any calibration can be conducted on the basis of air testing. The cost saving is appreciable. An advantage of this construction resides in the fact that as the disc is rotated it is wiped against the resilient outlet with what may be called a squeegee action. This cleans the plate and the orifices insuring good accuracy over a long service life. Since spring 68 exerts a uniform load on the plate, the squeegee action is uniform whereas it was erratic in the prior design.

I claim:

1. In an oil control of the type having a float in a chamber regulating an inlet valve to maintain a constant level in the chamber to maintain a constant head on an outlet from the chamber, a thin, flat, circular plate positioned at said outlet and having a multiplicity of metering orifices therein located about the center of the plate for rotation into registry with the outlet as the plate is rotated, said plate being keyed to and axially slidable on a shaft, a manually actuatable knob for rotating the shaft, said orifice having a wiping surface facing the plate, a spring urging the plate into contact with said wiping surface with uniform force, a detent member mounted on the shaft and having radially outwardly facing hills and valleys, a spring member including a portion urged radially inwardly relative to the detent member to forceably engage a valley and to yieldably retain the plate in position to register one of the orifices in registry with the outlet or to a blank position corresponding to "off,"

a second spring member having a portion engaging the detent member in a substantially diametrically opposed position whereby the radial forces of the spring members cancel each other, the detent member being journaled in the housing to thereby journal the shaft, the area of said outlet being substantially greater than the largest of said metering orifices and the registry position of the orifices being substantially coaxial with the outlet whereby the flow characteristics through the outlet have no effect on the metering through the orifice.

2. A control according to claim 1 in which the spring members are mounted in the housing for limited movement whereby they engage the detent member slightly out of phase while the detent member is rotated to prevent a stable condition of the detent member with the spring members engaging said hills.

* * * * *